April 17, 1928.
L. T. FREDERICK
MICA SEPARATING MACHINE
Filed Aug. 16, 1926
1,666,130
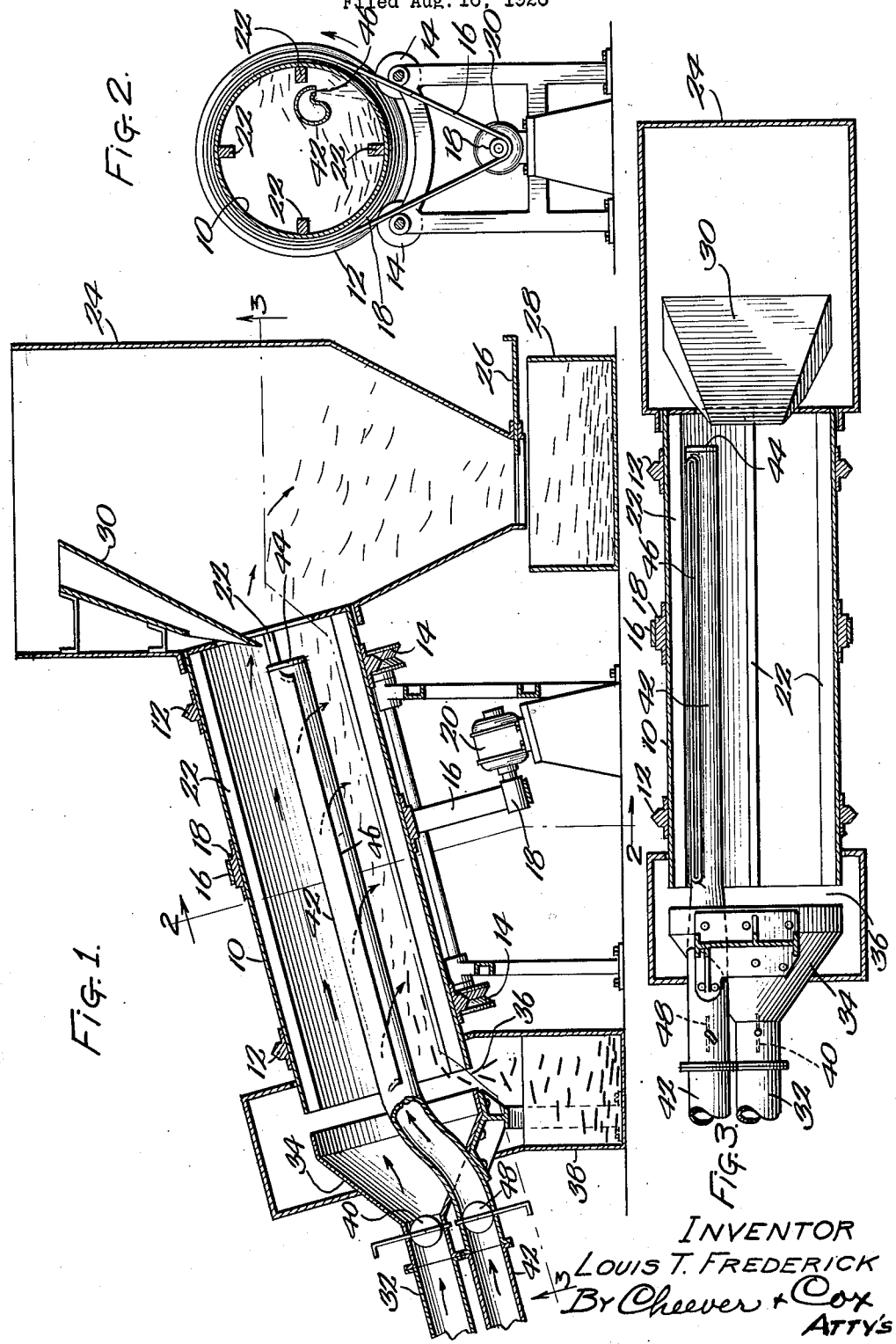
INVENTOR
LOUIS T. FREDERICK
By Cheever + Cox
ATTY's Patented Apr. 17, 1928.

1,666,130

UNITED STATES PATENT OFFICE.

LOUIS T. FREDERICK, OF VALPARAISO, INDIANA, ASSIGNOR TO CHICAGO MICA COMPANY, OF VALPARAISO, INDIANA, A CORPORATION OF ILLINOIS.

MICA-SEPARATING MACHINE.

Application filed August 16, 1926. Serial No. 129,374.

My invention relates to machines for splitting and separating the laminæ so that the resulting flakes may be used for manufacturing mica plate and other commodities. The object of the invention is to provide a machine having large capacity compared to the size of the machine and one that will efficiently sort the desirable thin flakes from those thicker pieces which require retreatment.

I obtain this object by the mechanism illustrated in the accompanying drawing, in which Figure 1 is an elevation of the machine, chiefly in central vertical section.

Figure 2 is a transverse section on the line 2—2 Figure 1.

Figure 3 is a plan section on the line 3—3 Figure 1.

Like numerals denote like parts throughout the several views.

In the particular design chosen to illustrate the invention a revolving drum 10 is provided with track rings 12 on its external surface, the same preferably being V-shaped for holding their position in V-shaped supporting rollers 14. The drum is driven in the present instance by a belt 16 passing around a belt ring 18 on the external surface of the drum. The belt is driven by a pulley 18 of a motor 20. It will be understood that the drawing is to a certain extent diagrammatic and that these parts may be greatly varied in design.

Baffles 22 are secured within the drum for tumbling the mica slabs or blocks, the present design showing four in number. The drum is inclined at an angle, usually between 12 and 20 degrees and is open at both ends. At the upper delivery end it discharges into a hopper 24 which receives the finished product. This hopper is shown to have a valve 26 at the bottom for temporarily arresting the discharge of flakes into a waiting receptacle such as the one marked 28. The mica slabs or blocks are introduced through a supply chute 30.

At the lower end of the drum there is an air duct 32 which terminates in a bell shaped enlargement 34 which is of approximately the same diameter as the drum and is spaced from it at the lower end to produce an opening 36 through which the slabs of mica may drop into a waiting receptacle 38 where they may be held pending retreatment. A blower, not shown, is provided for forcing a current of air through the duct 32, 34 and a damper 40 is provided for regulating the amount of air issuing from said duct.

A second air duct 42 passes through the side of bell 34 to a point within the drum adjacent to the side thereof as best shown in Figures 2 and 3. For convenience this will be termed the inner duct. In the form shown it extends almost the entire length of the drum and is closed at the forward end by a cap 44. It has a slot 46 extending along the bottom within the drum through which the current of air issues toward the side of the drum. It is provided with a damper 48 for regulating the blast of air through it. In the preferred embodiment the mouth or slot of pipe 42 faces downward and is about on the level of the drum axis. It is located just inside the path of the baffles and is on the rising side of the drum. Hence as the loosened mica blocks or slabs rise, under the action of the baffles, the air blast issuing from slot 46 strikes the edges of the rising slabs and loosens the flankes, thus enhancing and completing the separating action of the baffles.

Operation: The mica blocks as they come from the mine are first subjected to a treatment which will loosen more or less completely the laminations of which the material is composed. This may be accomplished in various known ways, for example, by bending them alternately in opposite directions. When this preliminary splitting or loosening has been accomplished the blocks are introduced into the tumbling drum 10 through the chute 30, whence they fall to the bottom of the drum. The drum is caused to revolve with the result that these slabs tumble over each other as they are acted upon by the baffles 22. As a result of the action of the slabs striking against each other and against the baffles and the sides of the drum the loosened laminæ or flakes are separated from each other. This action is enhanced by the blast of air issuing through the slot in the center pipe 42. This blast not only adds to the tumbling effect but also tends to blow the laminæ apart. It will be understood, however, that this blast of air may be dispensed with without rendering the machine inoperative.

As the thin flakes are separated from each other or from the slab, the blast of air coming from the duct 32, 34 blows them out of the upper end of the drum into the hopper 24 whence they are collected for use. The heavier flakes and the slabs which failed to become separated during the process fall to the bottom of the drum and gradually gravitate out of the lower end into the receptacle 38. From here they may be passed again through a preliminary machine like the one above mentioned or they may be reintroduced into the drum if the slabs appear to be loosened sufficiently.

I have found this machine to be very efficient and to have a very large capacity compared to its size. The combined effect of the treatment received in the drum effects a very complete separation and flakes are removed which are extremely thin. They are also of considerable size, for example 1 x 1 inches to 1 x 2 inches. Flakes of this size and thinness are of great advantage in the production of mica plate and produce a high quality of product. By regulating the blast of air through the ducts 32, 34 the thickness of the delivered flakes may be regulated, for it will be evident that the heavier the blast of air the thicker will be the flakes which are carried over by it and vice versa.

Having thus described my invention what I claim as new and desire to secure by Letters Patent is:

1. A machine for separating mica flakes having a rotating tumbling drum, baffles within the drum for tumbling the loosened mica slabs, and an air blast pipe having an opening adjacent to the inside of the drum and facing in a direction opposite to the direction of rotation of the drum for blowing the loosened flakes from the mica blocks.

2. In a machine for separating mica flakes having a rotating tumbling drum, baffles within the drum for tumbling the loosened mica slabs, and an air blast pipe having an opening facing downward and located approximately on a level with the axis of the drum and adjacent to the path of the rising baffles whereby the blast issuing from the pipe is directed approximately against the edges of the block of mica as they rise under the action of the baffles.

3. In a machine for separating mica flakes having a rotating tumbling drum, baffles within the drum for tumbling the loosened mica slabs, an air blast pipe having an opening facing downward and located approximately on a level with the axis of the drum and adjacent to the path of the rising baffles whereby the blast issuing from the pipe is directed approximately against the edges of the block of mica as they rise under the action of the baffles, and means for regulating the blast of air in said pipe.

In witness whereof, I have hereunto subscribed my name.

LOUIS T. FREDERICK.